Dec. 10, 1935.     O. M. GLUNT     2,023,581
SOUND PICTURE PROJECTOR
Filed Feb. 24, 1933     4 Sheets-Sheet 2

INVENTOR
O. M. GLUNT
BY
ATTORNEY

Dec. 10, 1935.   O. M. GLUNT   2,023,581
SOUND PICTURE PROJECTOR
Filed Feb. 24, 1933   4 Sheets-Sheet 3

INVENTOR
O. M. GLUNT
BY
G. H. Heydt.
ATTORNEY

Dec. 10, 1935.    O. M. GLUNT    2,023,581
SOUND PICTURE PROJECTOR
Filed Feb. 24, 1933    4 Sheets-Sheet 4
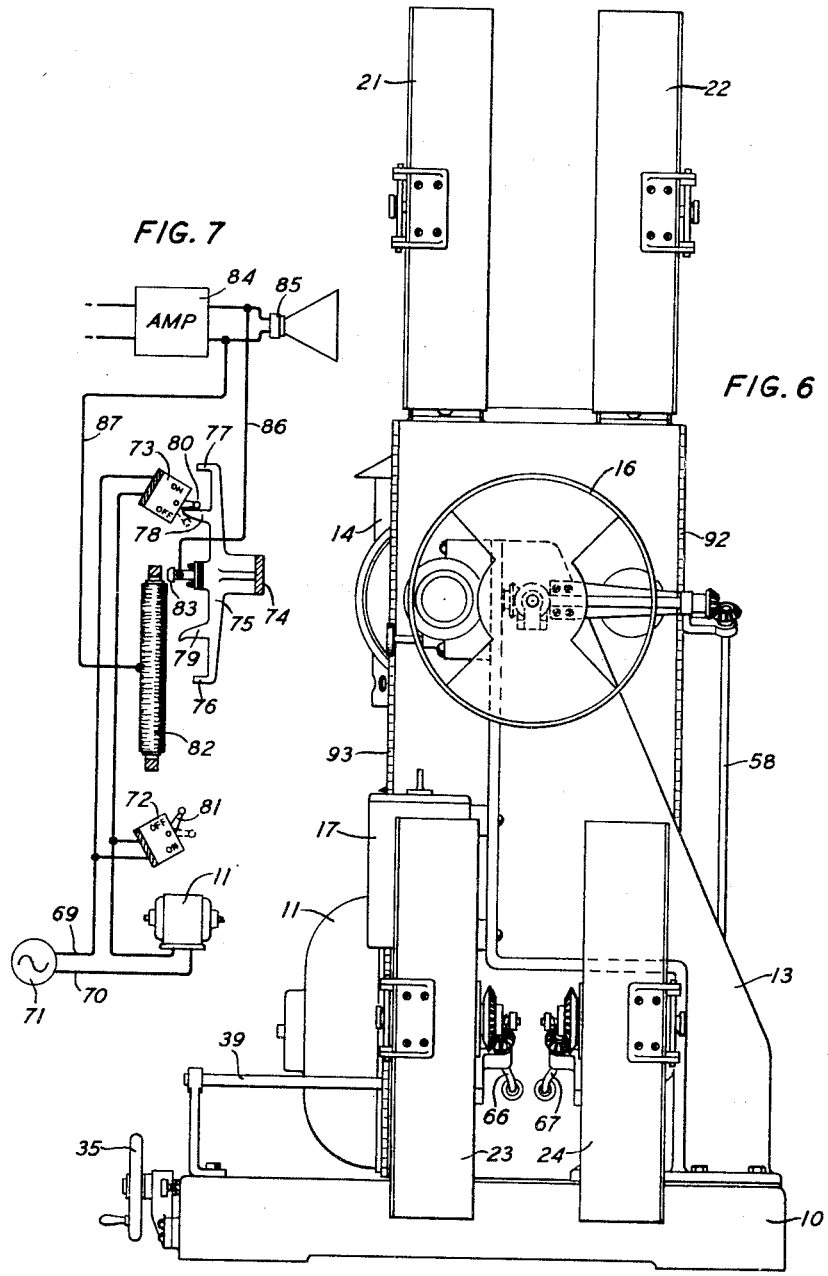
INVENTOR
O. M. GLUNT
BY
G. H. Heydt.
ATTORNEY Patented Dec. 10, 1935

2,023,581

UNITED STATES PATENT OFFICE 2,023,581

SOUND PICTURE PROJECTOR

Omer M. Glunt, Rutherford, N. J., assignor to Bell Telephone Laboratories, Incorporated, New York, N. Y., a corporation of New York Application February 24, 1933, Serial No. 658,318

8 Claims. (Cl. 88—16.2)

This invention relates to combined motion picture apparatus and sound film reproducing apparatus adapted to operate in synchronism with each other.

Hereofore it has been frequently customary in reproducing multi-reel pictures to provide duplicate sets of sound and picture reproducing apparatus in order to prevent interruption between the projection of successive reels, one reel being projected from one set while the next reel is made ready for projection on the other set. Such a duplication of parts, however, is expensive and also renders the equipment less portable.

In accordance with this invention a single unit is provided which includes in its preferred embodiment two motion picture projectors and two sound film projectors so combined in the unit that certain parts are made common to the two picture projectors and other parts are made common to the two sound film projectors without impairing the substantially continuous operation of the unit for use in the reproduction of multi-reel films. The invention, therefore, provides a duplex projector for sound pictures which is more readily portable than prior types of similar apparatus. The apparatus unit used in common may be mounted on a stationary support, while the parts individual to each of the two sets may be mounted for movement relative to the stationary support to make effective either set of individual parts as may be desired. For example, the unit may comprise only one picture lamp, one sound lamp, one photoelectric cell, one flicker shutter and a common source of power. This common apparatus may be associated with a movable platform supporting spaced pairs of film magazines, each magazine pair having associated therewith an individual sound gate, a picture gate and film controlling sprockets or other guiding means. When the movable platform is shifted to change from one film supply to the second film supply means may be provided for causing the said movement to temporarily slow the speed of the driving motor and cause a corresponding fading effect in the reproduced sound during the short time interval required for the switch-over.

This invention will be better understood by reference to the following detailed description taken in connection with the accompanying drawings in which:

Fig. 6 is a front view of the projector; and

Figure 2:
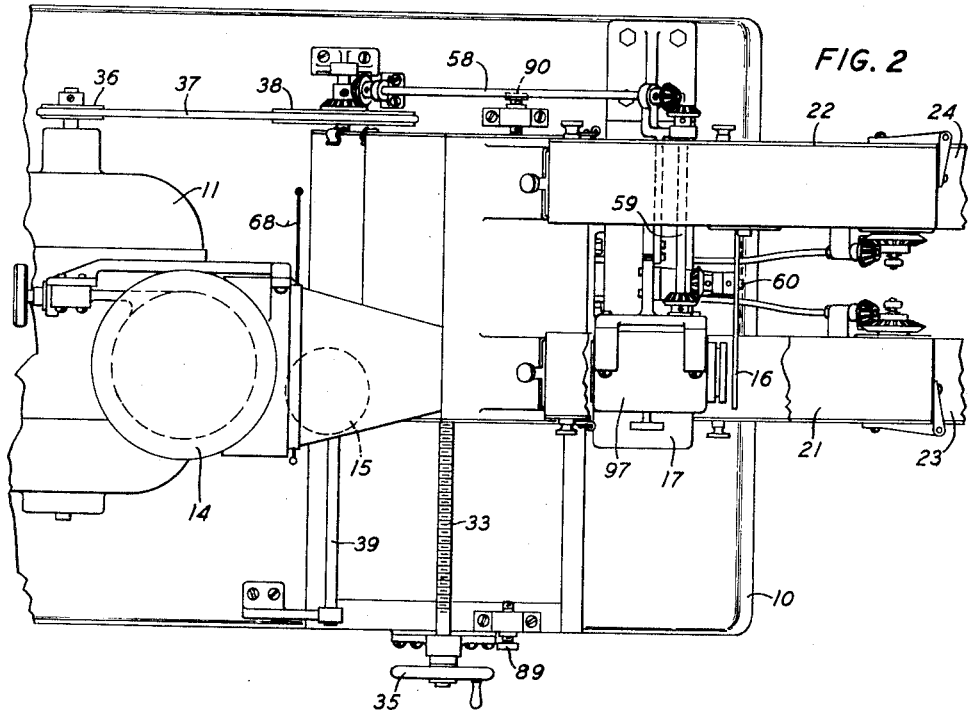
Fig. 2 is a top view of the apparatus of Fig. 1.
Figure 5:
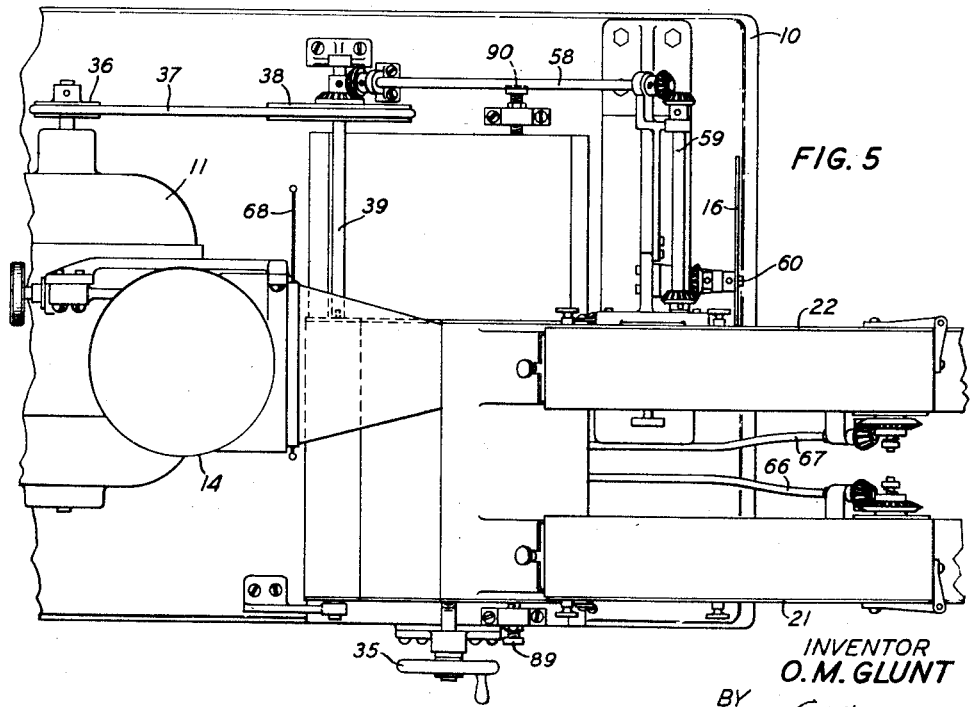
Fig. 5 is a top view similar to Fig. 2 except that the movable apparatus is in an alternative position.

Fig. 7 discloses certain electrical control circuits which may be actuated when the movable apparatus is shifted from the position of Fig. 2 to the position of Fig. 5 or vice versa.

Figure 1:
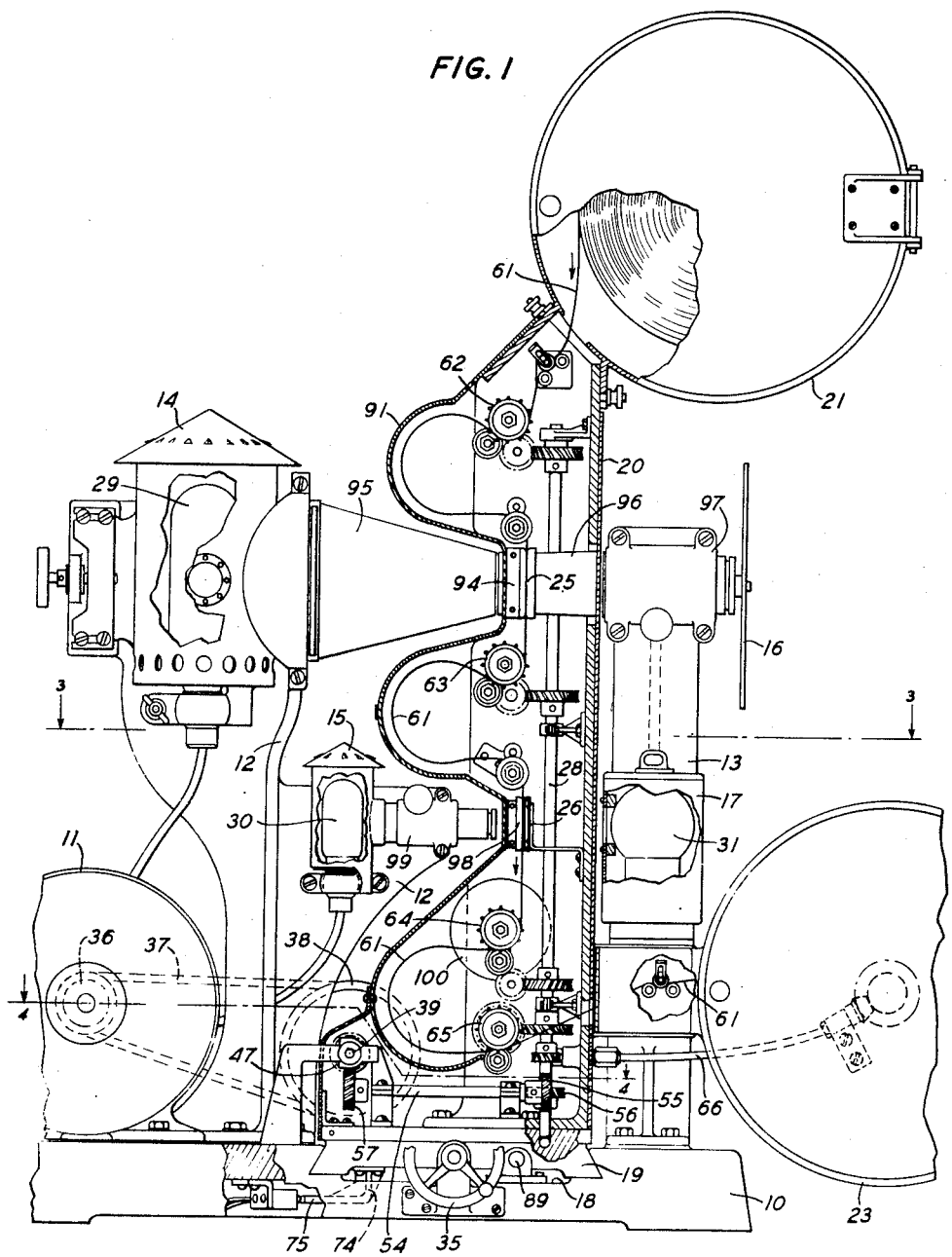
Fig. 1 represents a side view partly in cross-section of a duplex sound picture projector embodying this invention.

The projector illustrated in the drawings, particular reference being made to Fig. 1, comprises a base plate 10 on which are mounted the driving motor 11 and two spaced standards 12 and 13, standard 12 serving as a support for the picture lamp housing 14 and the sound lamp housing 15, while standard 13 supports a flicker shutter 16, a photoelectric cell housing 17 and may also support the usual preliminary amplifier for the output of said cell. The base 10 has a groove 18 running across the base to provide a runway for a movable platform 19 on which is mounted a standard 20 for supporting two film supply magazines 21, 22, two film take-up magazines 23, 24, two picture gates such as picture gate 25, two sound gates 26, 27, two vertical drive shafts 28, 32 and certain other apparatus to be described later. Either picture gate is adapted to be aligned with the picture lamp 29 and shutter 16 and similarly the sound gate corresponding to each picture gate is adapted to be aligned with the sound lamp 30 and photoelectric cell 31.

In order to shift the platform 19 and the apparatus mounted thereon a screw member 33 (see Fig. 2) is provided suitably mounted on one side member of base 10 and projecting into a threaded wall 34 of platform 19 so that a handwheel 35 mounted on the outer end of the screw may be turned to move the platform 19 in either direction depending upon the direction of rotation.

Figure 4:
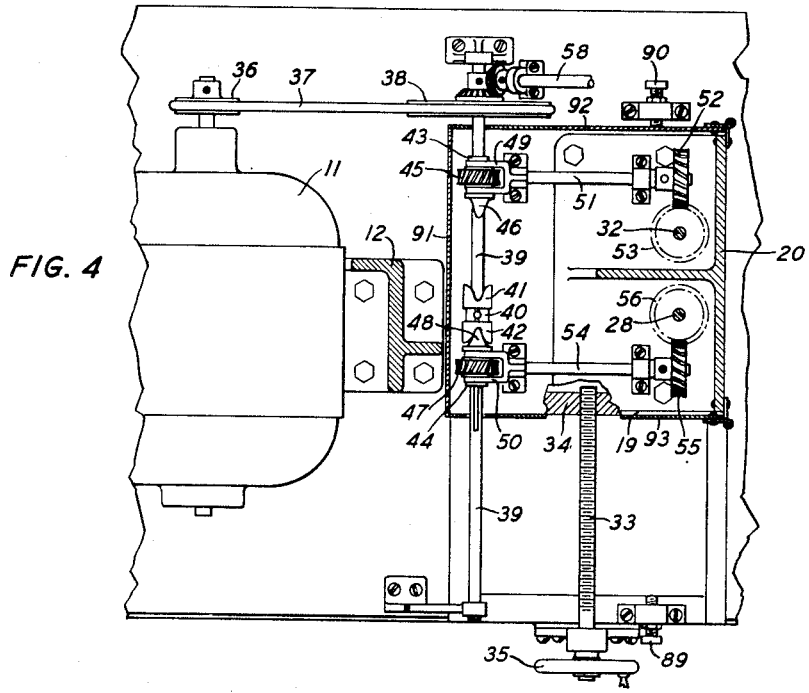
Fig. 4 is a further sectional view taken along the plane marked 4—4.

The shaft of motor 11 has a grooved pulley 36 connected by a belt 37 to a pulley 38 on the end of an idler shaft 39 suitably mounted on the stationary base 10 parallel to groove 18. Fixed to the shaft 39 as shown in Fig. 4 is a collar 40 having two oppositely directed clutch members 41, 42, each clutch member having two notches 180° apart. Surrounding the shaft 39 are also two loosely mounted collars 43, 44, which are free to slide along shaft 39 as described later. Integral with collar 43 is a gear wheel 45 and a projecting lug 46, said lug being adapted to enter one of the notches in clutch 41. Similarly collar 44 has a gear wheel 47 and a projecting lug 48 which is adapted to enter one of the notches in clutch 42. Suitably mounted on the movable platform 19 is a forked member 49 for holding collar 43 in a definite position relative to the movable platform. Similarly, a forked member 50 also mounted on the platform 19 is provided for holding collar 44 in a definite position relative to the movable platform. A counter shaft 51 mounted on platform 19 has at one end a suitable gear (not shown) for meshing with gear 45 and at its other end is a gear 52 meshing with a gear 53 mounted on the lower end of the vertical shaft 32 so that shaft 32 will be rotated whenever lug 46 is in position to engage clutch member 41. Similarly, a counter shaft 54 mounted on platform 19 has at one end a suitable gear 57 (see Fig. 1) for meshing with gear 47 and at its other end is a gear 55 meshing with a gear 56 mounted on the lower end of the vertical shaft 28 so that shaft 28 will be rotated when, as shown in Fig. 4, lug 48 is in position to engage clutch member 42.

Shaft 39 also enables motor 11 to drive the flicker shutter 16. A gear on the inclined shaft 58 (Figs. 2 and 5) meshes with a gear on the end of shaft 39 and by means of other suitable gearing, shaft 58 drives a horizontal shaft 59 which in turn is coupled to the shaft 60 of the flicker shutter 16. The flicker shutter 16 is, therefore, directly coupled to the shaft 39 which drives the film sprockets.

In preparing the projector for operation, a film 61 (see Fig. 1) from the film supply magazine 21 may be threaded over feed sprocket 62, an intermittent drive sprocket 63 for pulling the film past the picture gate 25, a constant speed sprocket 64 for driving the film past the sound gate 26, a take-up sprocket 65 and thence to a reel in take-up magazine 23 which reel is adapted to be driven by a flexible shaft 66 geared to the vertical shaft 28. Similarly another film may be threaded between the supply magazine 22 and take-up magazine 24 on corresponding sprockets coupled to vertical shaft 32 for feeding the film past the other picture gate (not shown) aligned with gate 25, and for feeding the film past the other sound gate 27. The various sprockets for the second film are positively driven by gears on shaft 32 previously described. The reel in take-up magazine 24 is driven by a flexible shaft 67 (Fig. 5) coupled to a gear on the vertical shaft 32. It is to be understood as previously described (see Fig. 4) that only one of the shafts 28, 32 is driven by motor 11 at any particular instant. Sound sprocket 64 has a flywheel 100 mounted on its shaft to prevent irregularities in film drive and sprocket 88 has a flywheel 101 for a similar purpose.

Figure 3:
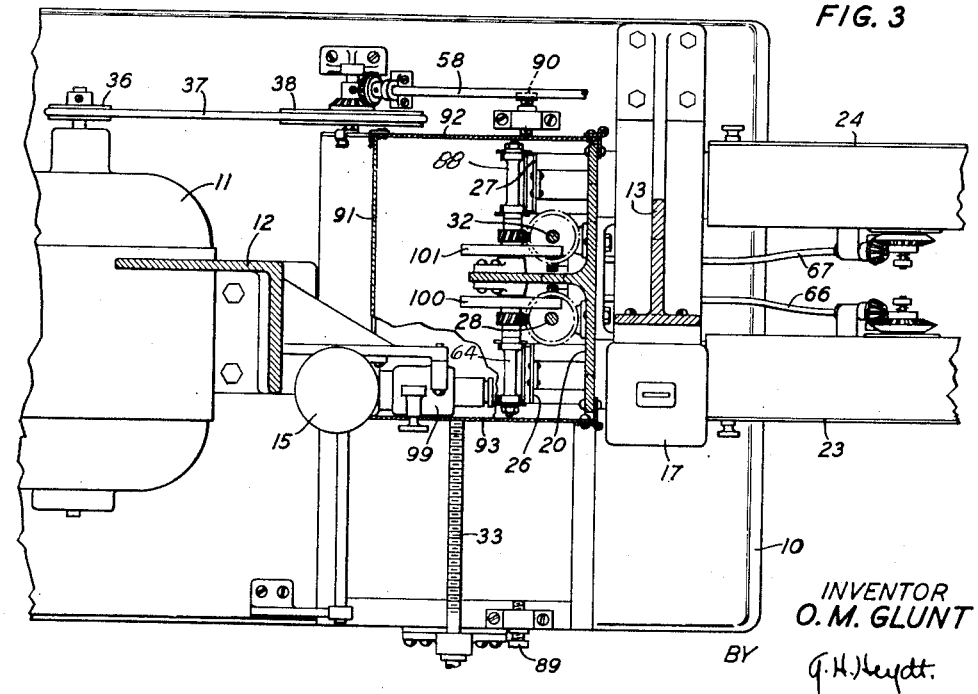
Fig. 3 is a sectional view of the apparatus of Fig. 1 taken along the plane marked 3—3.

Assuming that the platform 19 is in the position shown in Figs. 2, 3 and 4 it will be apparent that when motor 11 is started, the vertical shaft 28 will be rotated by the motor and, therefore, the sound and scene on film 61 will be reproduced in the well known manner. At the time the film 61 is being reproduced the operator may thread between magazines 22 and 24 the next reel of film desired to be reproduced. When the end of film 61 is reached from a reproduction standpoint, a hand douser 68 may be operated to temporarily cut off the light from picture lamp 29 and the operator will also revolve wheel 35 to bring into alignment with the picture lamp and the sound lamp the film previously threaded between magazines 22 and 24.

During the small time interval required to bring the new film into position it would also be desirable to slow the motor speed and also reduce the sound output from photoelectric cell 31. One way this may be accomplished is shown in Figs. 1 and 7.

Referring more particularly to Fig. 7 the power leads 69 and 70 from the source of power 71 leading to motor 11 are open except when one of the toggle switches 72, 73 is in its "on" position, to complete the circuit for lead 69. These two toggle switches are mounted in spaced relation underneath the base 10 as shown in the side view of Fig. 1. Rigidly mounted underneath platform 19 (Fig. 1) is a dependent arm 74 having a lateral extension 75 provided with two short lugs 76, 77 for opening switches 72, 73 respectively, and having two longer lugs 77, 78 for closing switches 72, 73 respectively, due to the actuation of the switch arms 80, 81 by the said lugs. In the position shown in Fig. 7 switch 73 is closed and switch 72 is open.

As soon as platform 19 begins to move from its position shown in Figs. 2, 3 and 4 to the position shown in Fig. 5, the said movement being due to the operation of handwheel 35, the resulting movement of arm 74 causes lug 77 to contact with switch arm 80 and throw the said switch arm in a clockwise direction to the dotted position shown in Fig. 7, thereby opening switch 73 and disconnecting the power source from motor 11. The continued movement of platform 19 in the same direction will cause lug 79 to contact with switch arm 81 and throw it in a clockwise direction to the dotted position shown, to close the switch 72 and reconnect the motor with its source of power. The arrangement is preferably such that lug 79 does not operate switch 72 to speed up the motor until the lug 46 (Fig. 4) on collar 43 has engaged clutch member 41 to couple the vertical shaft 32 with the horizontal shaft 39. It will be obvious that the movement of platform 19 in the reverse direction will cause lug 76 to open switch 72 and will cause lug 78 to subsequently close switch 73. The movable platform 19 is shown in one of its possible positions in Figs. 2, 3, and 4 where the film from magazine 21 is in position for reproduction. Its other possible position is shown in Fig. 5 where the film from magazine 22 is in place for reproduction.

As previously stated, it would also be desirable to reduce the sound output from the projector while transferring from one reel of film to a second reel. One way this may be accomplished is to mount underneath the base 10 adjacent the path of arm 74 a potentiometer 82, wound with bare resistance wire in a spiral path, preferably wound in such a manner that the amount of resistance per unit length along its axis is a minimum at or near the midpoint and a maximum near each end. Arm 74 is provided with a contact brush 83 adapted to slide along the potentiometer except that said brush is out of contact with the potentiometer wire when arm 74 is in either of its extreme positions. One of the leads between the sound amplifier 84 and loudspeaker 85 associated with the projector has a wire 86 connected to brush 83 while the other lead between the amplifier and loudspeaker has a wire 87 connected to the midpoint of the potentiometer. It will thus be apparent that when brush 83 is at the midpoint of the potentiometer there will be practically a short circuit across the output of amplifier 84 but as the brush is moved away from the midpoint position the amount of the resistance in shunt to the amplifier output will increase until the brush moves off the potentiometer at either extreme position and opens the shunt path across the amplifier output. By varying the tapering of the potentiometer wire the manner in which the fading of the sound output is effected may be varied to meet the requirements desired.

It should be apparent that the above described apparatus greatly facilitates the reproduction of multi-reel sound picture film by the operator. At the time the machine is being operated to reproduce the sound and picture records on the film roll from supply magazine 21 the operator may open the door in the other supply magazine 22 to insert the next roll of film in magazine 22 and thread it through the machine to the take-up magazine 24. When reproduction from the roll in magazine 21 has been completed the operator will promptly rotate handwheel 35 to slide platform 19 so as to place the film from magazine 22 in operative position, at the same time operating the douser 68 in the usual manner. While the film from magazine 22 is being reproduced the operator will open the doors in magazines 21 and 23, remove the previously reproduced roll of film and insert the third roll of film to be reproduced, etc. The time required for sliding the platform 19 from one extreme position to the other need be only a few seconds and may be regulated by varying the pitch of the screw 33. It should be noted that the doors for the magazines 21 to 24 face outwardly, that is, on the side of each magazine remote from the adjacent magazine in order to facilitate the insertion and removal of the film.

Suitable stops may be provided so that slidable platform 19 when moved to either extreme position will be stopped with the film in proper alignment with the sound and picture lamps, the photoelectric cell, etc. For example, on the stationary base 10 may be mounted two oppositely directed adjustable screws 89, 90 so that the platform 19 at one time may be moved until a flange thereon hits screw 89, the platform subsequently being moved in the other direction until a flange on the platform strikes screw 90.

It will generally be found desirable to provide a housing for certain of the above described apparatus to prevent possible injury to the operator as well as to insure quiet operation. For example, the vertical shafts 28, 32 and associated film sprockets may be substantially enclosed in a housing comprising standard 20 and side walls 91, 92, 93 supported therefrom. Side walls 92, 93, of course, include suitable doors to allow access to the film sprockets, etc. These walls 20, 91, 92, 93 may, if desired, be arranged to have sound absorbing properties by being lined or made of materials designed for that purpose.

The picture lamp, sound lamp and related apparatus may be of any suitable standard construction except for the special modifications required to obtain duplex operation. The side wall 91 for the movable equipment is apertured to receive a small tube 94 for each picture gate, which tube when moved to the proper position will virtually be a continuation of the housing 95 extending from the picture lamp. Similarly the standard 20 is apertured to receive a tube 96 for each picture gate to pass the light rays transmitted through the film to an appropriate lens system contained in the lens housing 97, the adjacent ends of tube 96 and housing 97 being as close together as practicable, bearing in mind that tube 96 is movable with respect to housing 97. Similarly the side wall 91 is apertured to receive a small tube 98 for each sound gate adapted to be aligned with the lens housing 99 for the beam of light from the sound lamp 30, the said beam subsequently passing through the sound record on the film, through a corresponding aperture in wall 20 to the photoelectric cell 41.

For the purpose of this invention it may be assumed that the motor 11 rotates at constant speed and that the associated shafts and gearing produce the proper travel of the film past the picture and sound gates as in the ordinary simplex projector. One additional point, however, which requires consideration in the duplex projector of this invention is to insure that the film travel is properly phased with respect to the flicker shutter 16. This may be taken care of by having as many spaced notches in each of the clutch members 41, 42 as there are apertures in the flicker shutter. For example, we may assume that flicker shutter 16 has two apertures 180° apart. Each clutch member 41, 42 should, therefore, be provided with two notches 180° apart so that, for example, lug 46 may engage either notch in clutch 41 and still have the film started in proper phase with the flicker shutter.

It is to be understood that this invention is not limited to any particular type of projector since various types of single projectors may be combined in accordance with this invention to provide for duplex operation. It is also not essential to this invention that the two projector units should use in common the various elements described above as other combinations of elements common to each projector and elements individual to each projector may also be found to be desirable under certain conditions.

What is claimed is:

1. A duplex sound picture projector comprising certain elements in common to both projectors and other elements individual to each projector, said individual elements comprising a plurality of picture gates and a plurality of sound gates, said common elements comprising a picture lamp housing, a sound lamp housing and a motor for driving the films for reproduction, a supporting base for said common elements, a platform for supporting said individual elements and mounted for movement relative to said base, a device for shifting said platform for alternately disassociating and associating the individual elements and the common elements and for successively disconnecting said motor drive from and connecting said motor drive to the alternate projectors, and switching means operated by the movement of said platform for retarding the speed of said motor.

2. A duplex sound picture projector comprising certain elements in common to both projectors and other elements individual to each projector, said individual elements comprising a plurality of picture gates and a plurality of sound gates, said common elements comprising a picture lamp housing, a sound lamp housing, a motor drive and a photoelectric cell, a supporting base for said common elements, a platform for supporting said individual elements and mounted for movement relative to said base, a device for shifting said platform for alternately disassociating and associating the individual elements and the common elements and for successively disconnecting said motor drive from and connecting said motor drive to the alternate projectors, and switching means operated by the movement of said platform for temporarily reducing the output from said photoelectric cell.

3. A duplex sound picture projector comprising certain elements in common to both projectors and other elements individual to each projector, said individual elements comprising a set including a sound gate, a picture gate and rotatable members for supporting the film and a second set comprising a second sound gate, a second picture gate, and other rotatable members for supporting the film, said common elements comprising a picture lamp housing, a sound lamp housing, and a motor for driving said members, power supply leads for said motor, a supporting base for said common elements, a frame for supporting said individual elements and mounted for movement relative to said base, a device for shifting said frame for alternately disassociating and associating the individual elements and the common elements and for successively disconnecting said motor drive and connecting said motor drive to the alternate projectors, and switching means operated by the movement of the said frame for first disconnecting said motor from said leads and subsequently reconnecting said motor to said leads.

4. A duplex sound picture projector comprising certain elements in common to both projectors and other elements individual to each projector, said individual elements comprising a set including a sound gate, a picture gate and rotatable members for supporting the film and a second set comprising a second sound gate, a second picture gate, and other rotatable members for supporting the film, said common elements comprising a picture lamp housing, a sound lamp housing and means for transforming variations of light in a light beam into corresponding electrical variations, a supporting base for said common elements, a platform for supporting said individual elements and mounted for movement relative to said base, a device for shifting said platform for alternately disassociating and associating the individual elements and the common elements and switching means operated by the movement of said platform for temporarily reducing the electrical output of said transforming means and subsequently increasing the output of said transforming means.

5. A duplex sound picture projector for scene and sound records on film comprising certain elements in common to both projectors and other elements individual to each projector, said individual elements comprising a set including a sound gate, a picture gate and a film drive and a second set comprising a second sound gate, a second picture gate and a second film drive, said common elements comprising a picture lamp housing, a sound lamp housing and a motor drive for the film drives, a supporting base for said common elements, a platform for supporting said individual elements, said platform being adapted to be moved to either of two positions, one position aligning said one set with said picture lamp housing and said sound lamp housing, the other position of said platform aligning said second set with said picture lamp housing and said sound lamp housing, a device for shifting said platform for alternately disassociating and associating the individual elements and the common elements, and switching means operated by the movement of said platform from said first to said second position for retarding the speed of said motor and subsequently restoring said motor to normal speed after said platform has reached its second position.

6. A duplex sound picture projector for scene and sound records on film comprising certain elements in common to both projectors and other elements individual to each projector, said individual elements comprising a set including a sound gate, a picture gate and a film drive and a second set comprising a second sound gate, a second picture gate and a second film drive, said common elements comprising a picture lamp housing, a sound lamp housing, a motor drive for the film drives and means for transforming variations of light in a light beam into corresponding electrical variations, a supporting base for said common elements, a platform for supporting said individual elements and mounted for movement relative to said base, said platform being adapted to be moved to either of two positions, one position aligning said one set with said housings and said transforming means, the other position aligning said second set with said housings and said transforming means, a device for shifting said platform for alternately disassociating and associating the individual elements and the common elements, and switching means operated by the movement of said platform from said first position to said second position for producing a dissolving effect in the output of said transforming means and subsequently removing the dissolving effect.

7. A duplex sound picture projector for scene and sound records on film comprising certain elements in common to both projectors and other elements individual to each projector, said individual elements comprising a set including a sound gate, a picture gate and a film drive and a second set comprising a second sound gate, a second picture gate and a second film drive, said common elements comprising a picture lamp housing, a sound lamp housing, a motor drive for the film drives and means for transforming variations of light in a light beam into corresponding electrical variations, a supporting base for said common elements, a platform for supporting said individual elements and mounted for movement relative to said base, said platform being adapted to be moved to either of two positions, one position aligning said one set with said housings and said transforming means, the other position aligning said second set with said housings and said transforming means, a device for shifting said platform for alternately disassociating and associating the individual elements and the common elements, and switching means operated by the movement of said platform from said first position to said second position for temporarily short-circuiting the output of said transforming means.

8. A duplex projector including certain elements common to both projectors and other elements individual to each projector, said individual elements comprising a delivery and a take-up reel, film gates and film feeding mechanism terminating in a slotted clutch member, said common elements comprising lamp housings, a flicker shutter, a double-ended clutch member and a motor for driving said clutch member and film feeding mechanism associated with said clutch member, a supporting base for said common elements, a platform for supporting said individual elements and mounted for movement relative to said base, a device for shifting said platform for alternately disassociating and associating the individual elements and the comon elements including said clutch member, means for so engaging said common clutch member with the individual clutch members as to synchronize the cyclic rotation of the shutter with the film feeding mechanism, and switching means operated by the movement of said platform for retarding the speed of said motor.

OMER M. GLUNT.